Oct. 3, 1944.   F. C. FRANK   2,359,516
BRAKE
Filed Sept. 18, 1940   5 Sheets-Sheet 1
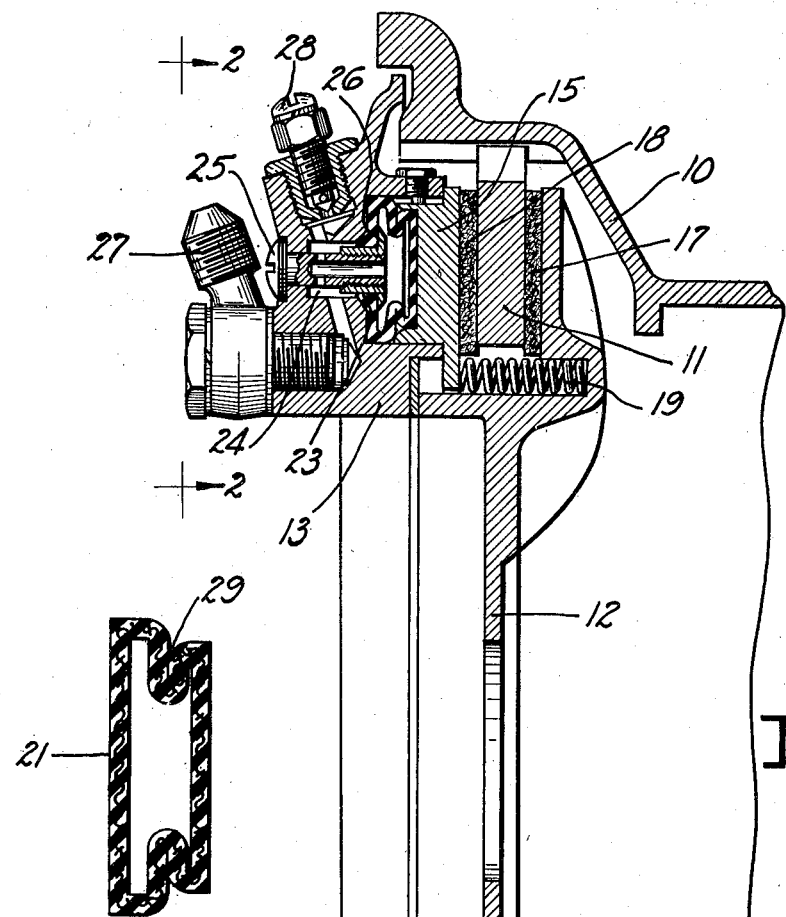
Fig.1
Fig.4
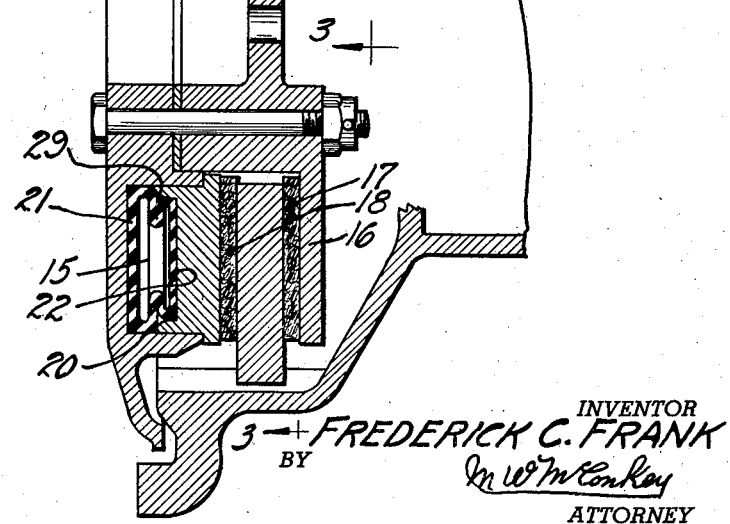
INVENTOR
FREDERICK C. FRANK
BY
ATTORNEY Oct. 3, 1944.　　　　F. C. FRANK　　　　2,359,516

BRAKE

Filed Sept. 18, 1940　　　5 Sheets-Sheet 2

INVENTOR
FREDERICK C. FRANK
BY
M. W. McConkey
ATTORNEY

Oct. 3, 1944.    F. C. FRANK    2,359,516
BRAKE
Filed Sept. 18, 1940    5 Sheets-Sheet 3

INVENTOR
FREDERICK C. FRANK
BY
M. W. McConkey
ATTORNEY

Oct. 3, 1944.　　　　F. C. FRANK　　　　2,359,516
BRAKE
Filed Sept. 18, 1940　　　5 Sheets-Sheet 4
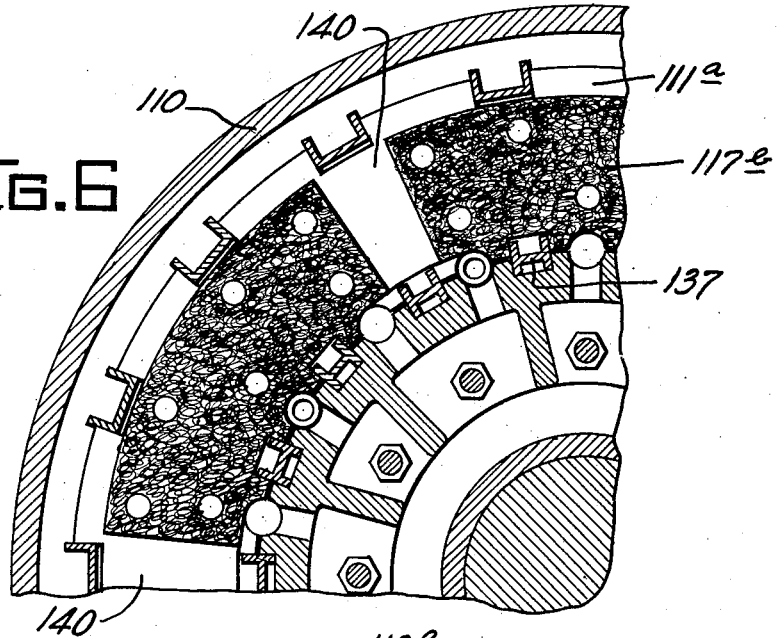
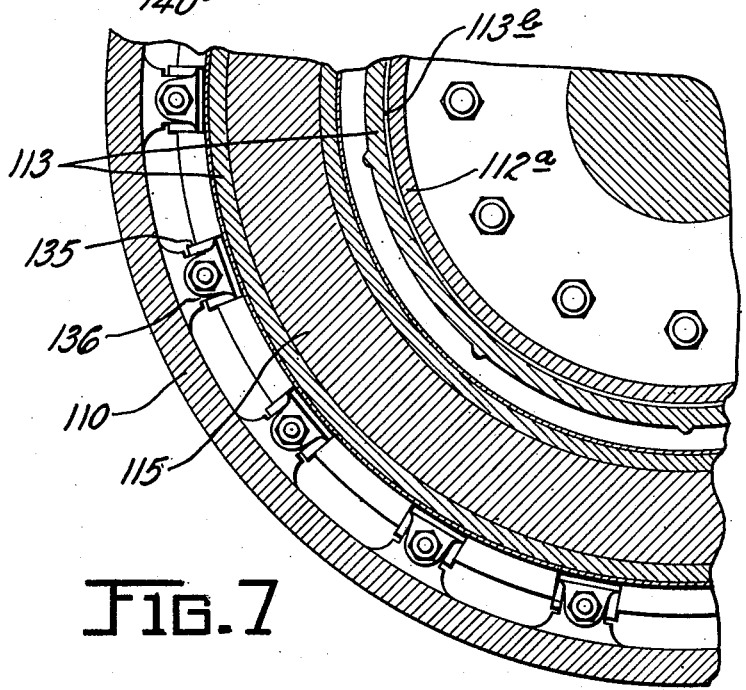
INVENTOR
FREDERICK C. FRANK
BY
M. W. McConkey
ATTORNEY Oct. 3, 1944.  F. C. FRANK  2,359,516
BRAKE
Filed Sept. 18, 1940   5 Sheets-Sheet 5

INVENTOR
FREDERICK C. FRANK
BY
ATTORNEY

Patented Oct. 3, 1944

2,359,516

UNITED STATES PATENT OFFICE 2,359,516

BRAKE

Frederick C. Frank, South Bend, Ind., assignor to Bendix Aviation Corporation, South Bend, Ind., a corporation of Delaware Application September 18, 1940, Serial No. 357,209

4 Claims. (Cl. 188—152)

The present invention relates to fluid pressure brakes and is illustrated as it might be used in conjunction with disc brakes for aircraft.

A primary object of the invention is to provide an improved pressure transmitting member for moving the stator portion or portions of the brake against the rotor portions thereof. To this end I have furnished a distensible rubber capsule, one side of which is confined in a recess in the brake applying piston, and the opposite side of which is confined within the walls of an annular chamber in which the piston moves. This serves to prevent any scrubbing action on the cylinder wall which might abrade the distensible or expansible capsule. The confinement of the tube or capsule also tends to eliminate any danger of bursting the tube, inasmuch as there is always support for the tube at the places where the braking pressure is transmitted. It will be obvious that my invention will accomplish the purposes set forth under this first objective in any type of brake whether it be a disc or a drum brake and whether it be applicable to land vehicles or aircraft.

A further object of my invention is to provide novel and effective means for cooling the friction members of the brake. Briefly this will be accomplished by drawing air past the rotor portions of the brake in a steady uni-directional stream.

Another object of my improved brake is to provide means for adjusting the brake to compensate for the wear of the friction lining and to accomplish such adjustment without removing the brake or the wheel with which it is associated from the airplane or other vehicle to which it is attached. This object is accomplished by making the cylinder portion of the brake applying means adjustable on the brake spider or supporting plate.

Other objects and desirable features of my invention will become apparent during the course of the ensuing description wherein reference will be had to the accompanying drawings, in which:

Figure 1 is a view in cross-section of an airplane wheel and brake assembly

Figure 4 is a cross-section close-up of the brake expanding tube shown in Figure 1;

Figure 6 is a section taken on the line 6—6 of Figure 5;

Figure 7 is a section taken on the line 7—7 of Figure 5;

Figure 2:
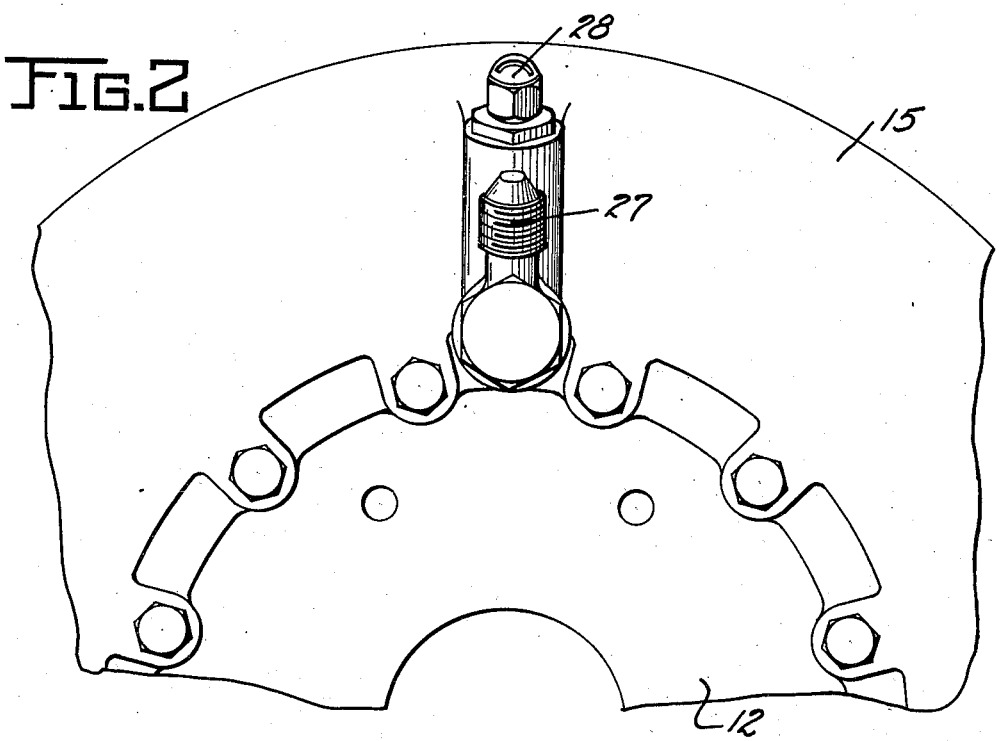
Figure 2 is a section taken on the line 2—2 of Figure 1.

In Figures 1 to 4 inclusive I have shown a wheel and brake assembly which includes a rotatable portion comprising a wheel 10 and an annular disc or rotor brake member 11; and a non-rotatable portion comprising a supporting member or backing plate 12, an annular chamber forming or enclosing member or cylinder 13 fixed to the supporting member and an annular plunger or piston member 15 which serves as the stator portion of the brake.

Figure 3:
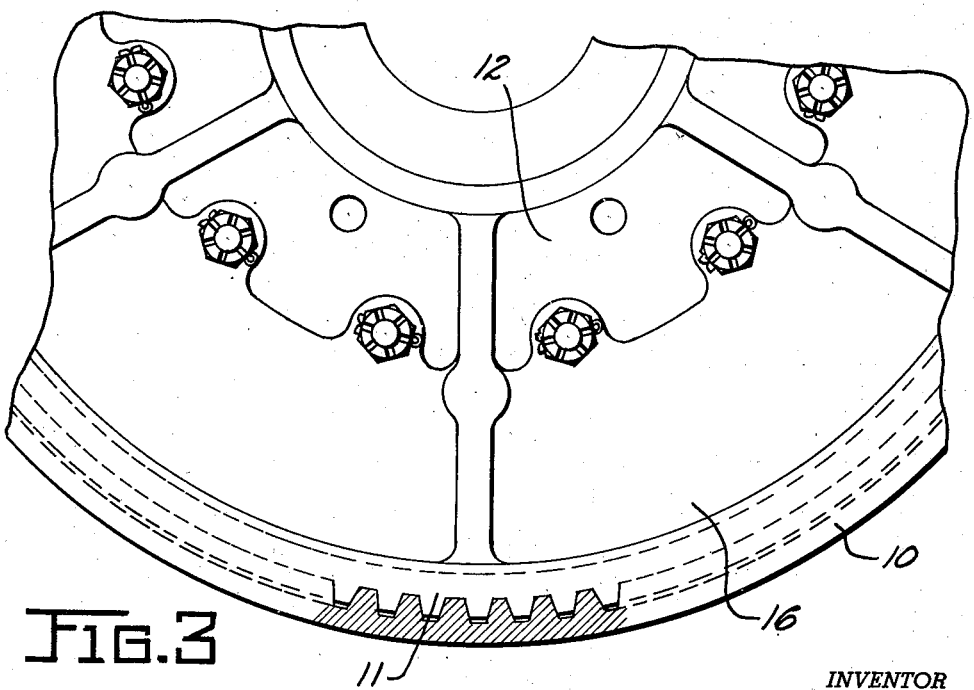
Figure 3 is a section taken on the line 3—3 of Figure 1.

As seen most clearly in Figure 3 the periphery of the annular disc or rotor brake member 11 is splined to the wheel 10. This allows the disc 11 to move axially of the wheel 10 but prevents circumferential movement of the disc.

The supporting member or backing plate 12 has an annular flange 16 which is faced with brake lining 17 of any suitable or desired type. The face of the plunger or piston member 15 likewise has fixed thereto a brake lining 18, the parts 17 and 18 being adapted to frictionally engage opposite sides of the annular disc 11 when the piston member is moved in the direction of the flange 16. A plurality of springs 19 are placed in compression between the piston 15 and the supporting plate 12 to hold the members 17 and 18 out of engagement with the disc 11 until the brakes are intended to be actuated.

The piston member 15 is reciprocable in an annular chamber or recess 20 formed in the member 13. Between the wall of the chamber 20 and the piston 15 is placed an extensible tube 21 made of rubber or other resilient material. A recess 22 is formed in the side of the piston adjacent the tube 21. One end of the tube 21 is confined within the recess 22 of the piston and the opposite end of the tube 21 is confined within the walls of the chamber 20. The side walls of the tube are folded inwardly, i. e., toward the center thereof as shown at 29.

In order to provide a strong and substantial tube, capable of withstanding heavy strains and stresses, I have formed a tube with one or more pieces of fabric in the center of the rubber body of the tube (Figure 4). The use of the fabric as a base or support for the rubber or other resilient material used in the tube serves to provide an exceptionally strong tube while at the same time permitting the rubber to adequately seal the fluid admitted to the interior of the tube.

As shown at 23 an opening is provided in the tube 21. Adjacent the opening is a recess 24 formed in the element 13. An externally threaded bolt 25 extends into the recess 24 and is threadedly engaged by a washer nut 26 which is arranged to clamp the tube against the walls of the chamber 20 adjacent the aforesaid opening in the tube. Sealing of the tube is thus accomplished through coaction of the bolt 25 and the washer nut 26. A series of passages through the washer 26, the bolt 25, and the member 13 connect the interior of the tube 21 with an inlet port 27 through which fluid may be derived from the fluid pressure braking system of the associated airplane or other vehicle. A bleeder screw 28 of the usual type is inserted in a suitable bleeder opening in the member 13, the said opening being connected with the interior of the tube 21.

When it is desired to operate the brakes, fluid under pressure is forced through the inlet 27 into the expansible tube 21 moving the piston member 15 in the direction of the flange 16 to cause frictional engagement between the parts 17 and 18 and the disc 11, the friction created impeding the rotation of the wheel 10. It will be noted that the sides of the expansible tube 21 do not rub along the walls of the chamber 20 during application of the brakes, the expansion of the tube acting to take up the slack in the tube structure, i. e., to eliminate the folds in the walls of the tube.

The modification of my device shown in Figures 5 to 9 is substantially similar to the brake already described. It includes a disc brake and an expansible resilient tube for applying the brake, the tube being substantially identical with that shown in Figures 1 to 4. There are, however, features of the modified device which make it worthy of mention in this specification.

Because of the general similarity in the two forms of my brake I shall use in Figures 5 to 9 the same designating numerals as used in Figures 1 to 4 with the addition of 100. It will be seen that the modified device includes a plurality of annular discs 111, 111a, and 111b which are secured to a wheel 110 and are rotatable therewith. A friction lining 117 is riveted or otherwise attached to an annular flange 116 extending from a supporting member or backing plate 112. A friction lining 118 is secured to the face of an annular contact member 115a which cooperates with a piston 115 in moving the stator and rotor brake elements into frictional engagement with one another. Between the rotor discs 111 and 111a, and between the discs 111a and 111b are stator discs 116a and 116b, each having a pair of friction surfaces, the four friction surfaces thus formed being designated by the numerals 117a, 117b, 117c, and 117d. The stator discs are keyed to the non-rotatable brake supporting member 112 by means of locking elements 137 which prevent rotation of the stator discs while allowing them to be moved along the axis of the wheel. It will of course be appreciated that any suitable or desirable number of rotor discs, stator discs, and associated friction surfaces may be provided.

A novel feature of my brake as shown in this modification is the use of an annular friction plate 130 which is fastened by suitable means, as bolts 131 to the body of a wheel 132. A friction material 133 is secured on the wheelward face of the flange 116. The provision of this extra friction surface adds available braking surface and allows the body of the wheel to support the backing plate and its flange when the said flange is pushed to the right owing to the stress of excessive force applied during brake application.

The brake actuating expansible tube 121 and the brake applying annular piston 115 are substantially similar to the tube and piston shown in Figures 1 to 4. The annular chamber forming member 113 is, however, so formed and secured in the brake assembly as to be adjustable. It will be noted that the chamber forming or enclosing member 113 is threaded as at 113b and is screwed onto an outwardly extending flange 112a of the backing plate member 112. A holding device 134 is associated with the flange 112a and the annular chamber forming member 113 to prevent unwanted rotation of the member 113. When there has been considerable wear on the several friction surfaces of the brake the play or slack in the brake may be considerable. If it is then desired to adjust the brake this may be accomplished by temporarily releasing the holding device 134, making one or more complete turns of the annular member 113 and again locking the member 113 by means of the device 134. This turning of the member 113 will cause that member to move to the right or in the direction of the wheel body. The member 113 will thus push the annular contact member 115a and through it move the stator and rotor discs into closer relationship with one another. In this connection it would be noted that the outer surfaces of the rotor discs 111, 111a and 111b are furnished with channels 135 which accommodate keys 136, the effect of the keys being to allow adjusting movement of the rotor discs along the axis of the wheel and drum while causing the rotor discs to rotate with the wheel and drum.

Figure 5:
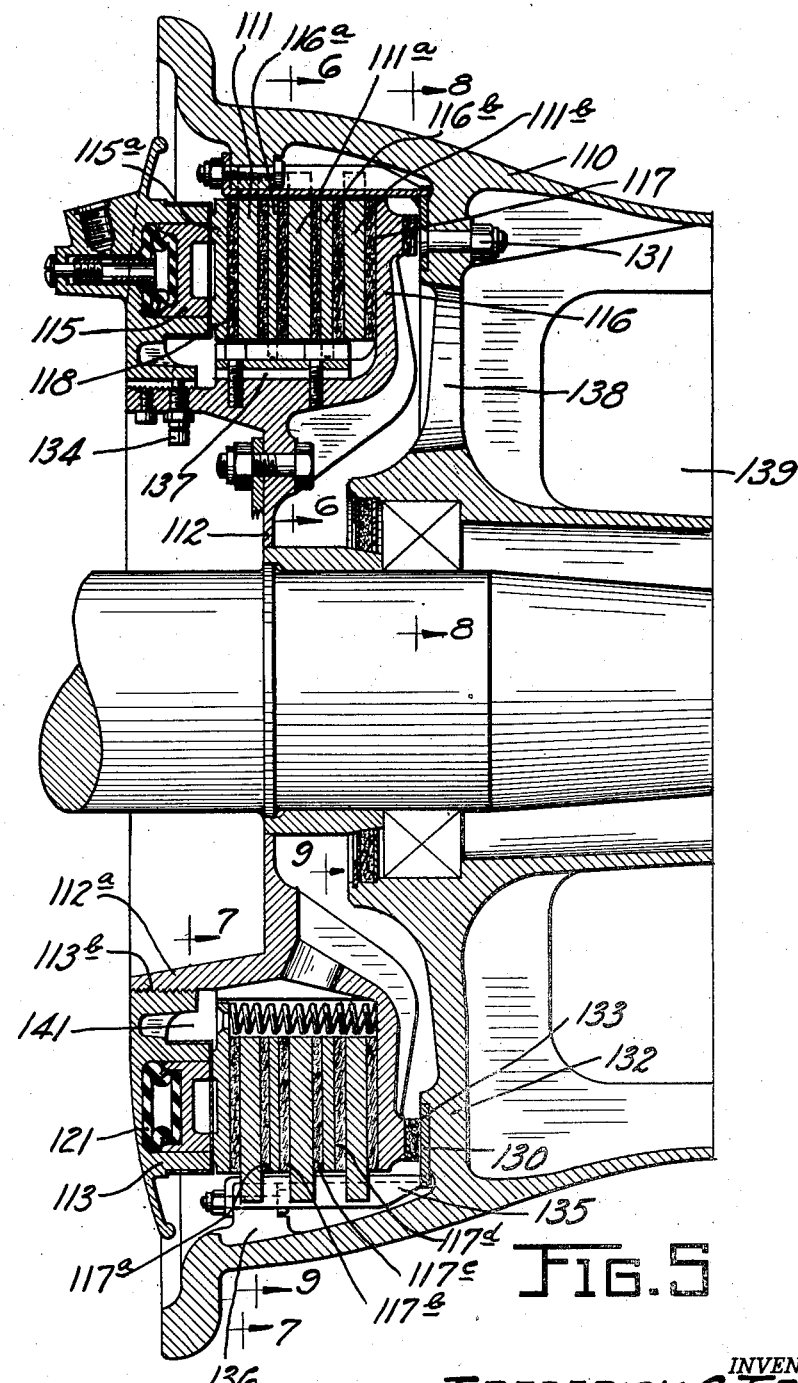
Figure 5 is a cross-sectional view of an airplane wheel and brake assembly showing a modification of the invention presented in Figure 1.
Figures 8, 9:
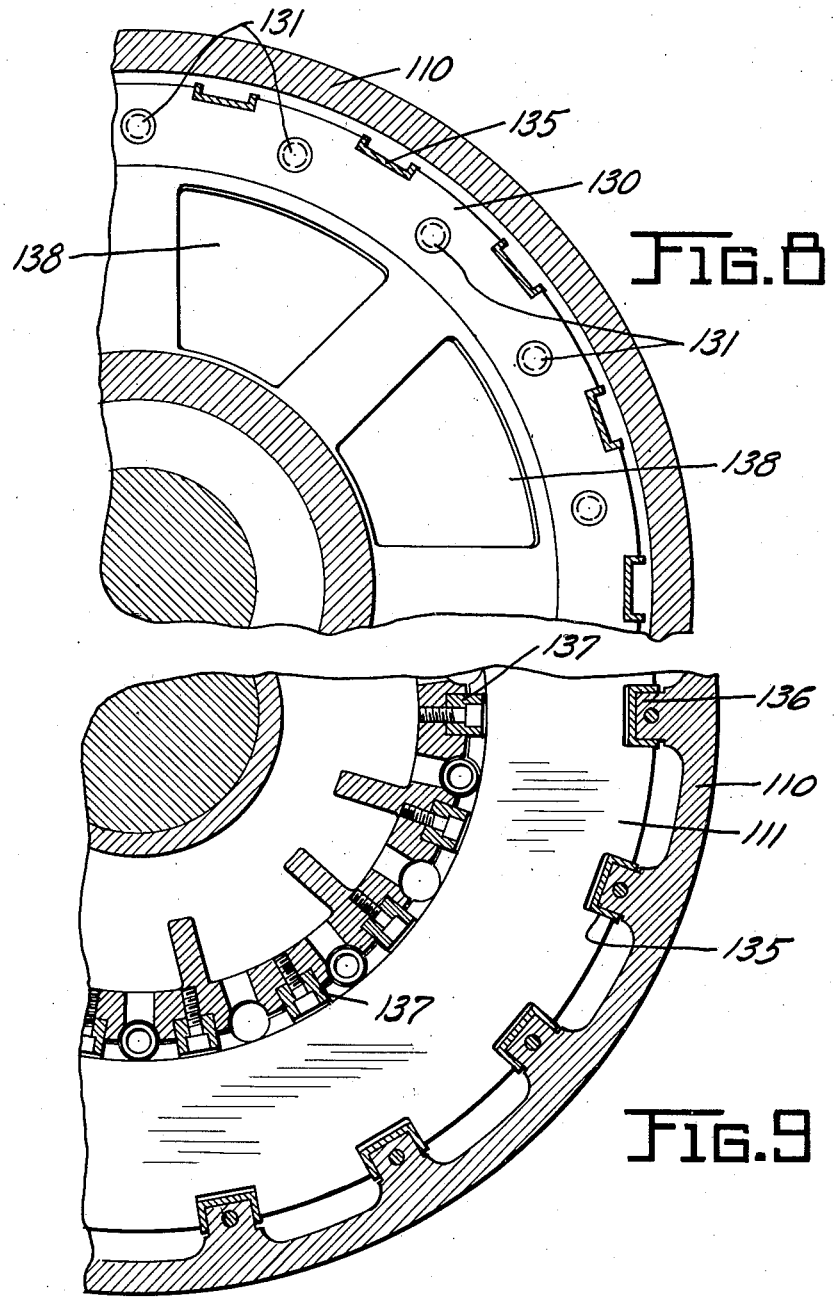
Figure 8 is a section taken on the line 8—8 of Figure 5.
Figure 9 is a section taken on the line 9—9 of Figure 5.

An advantageous feature of my device is the cooling means provided for the brake. Referring to Figure 5, it will be noted that a series of openings or inlets 138 are provided in the supporting member 132. Air from the center of the brake assembly may thus be drawn from a chamber 139 formed between the brake drum and the brake supporting member, through the air inlets 138 and into contact with the friction parts of the brake. In Figure 8 it will be apparent that the brake lining or friction material with which the stator brake elements are faced is segmented to provide spaces 140 between the separate pieces of brake lining. Thus the centrifugal force of the rotating drum and rotor discs is allowed to draw air through the inlets 138 and through the openings 140 to cool the friction faces of the rotor discs as they pass over the openings 140 through which the air current is passing. The heated air under the centrifugal force exerted by the rotating member of the brake passes into a chamber 141 adjacent the brake drum and is admitted from this chamber to the exterior of the wheel and brake assembly. Thus it will be seen that I have provided a system for cooling the friction members of a disc brake by means of a current of air whose movement is induced by the centrifugal force of the rotating members of the brake.

It is obvious that certain of the features of my braking device may be used in other instances than the specific embodiments shown. It is therefore my intention not to limit my invention to the specific embodiments shown or to limit the said invention in any way other than the terms of the appended claims

I claim:

1. A disc brake comprising a rotor member, a stator member, a piston for at times moving said stator member into frictional contact with said rotor member, a cylinder in which said piston is reciprocable, and a tube for moving said piston relative to said cylinder, the tube having substantially flat surfaces on opposite ends and having its sides intermediate the ends normally folded inwardly toward the center of the tube when the brake is in released position, the piston and the cylinder having respectively flat surfaces engaged by the flat end surfaces of the tube and having pairs of adjacent inner and outer coaxial cylindrical surfaces, one of each pair within and the other encircling said tube and confining the inside and the periphery of the tube adjacent its two ends, whereby the ends of the tube are seated respectively in one end of the cylinder and in the back of the piston and the tube is confined against expansion otherwise than in an axial direction.

2. A disc brake comprising a rotor member, a stator member, a piston for at times moving said stator member into frictional contact with said rotor member, a cylinder in which said piston is reciprocable, a tube for moving said piston relative to said cylinder, and means for admitting fluid under pressure to the interior of the said tube, the tube having substantially flat surfaces on opposite end and having its sides intermediate the ends normally folded inwardly toward the center of the tube when the brake is in released position, the piston and the cylinder having respectively flat surfaces engaged by the flat end surfaces of the tube and having pairs of adjacent inner and outer coaxial cylindrical surfaces, one of each pair within and the other encircling said tube and confining the inside and the periphery of the tube adjacent its two ends, whereby the ends of the tube are seated respectively in one end of the cylinder and in the back of the piston and the tube is confined against expansion otherwise than in an axial direction.

3. A disc brake for aircraft comprising a brake drum, one or more rotor discs associated therewith, a brake supporting member, one or more stator discs connected to the supporting member and interspersed with the rotor discs, an annular plunger for moving the stator discs into frictional engagement with the rotor discs, and an annular chamber forming member having the plunger reciprocable therein and having threaded engagement with the brake supporting member so that it may be rotated relative to the supporting member to adjust the position of the discs after substantial wear thereof.

4. A disc brake comprising a rotor member, a stator member having a surface lined with friction material, an annular plunger for at times moving the stator member against the rotor member to impede rotation of the rotor member, said plunger having an annular recess at one side thereof, a chamber forming member having an annular chamber enclosing at least partially said annular plunger, and an expansible tube for moving the plunger relative to the chamber forming member, said tube having one end thereof confined in the plunger recess, having the opposite end thereof confined in the walls of the chamber formed by the chamber forming member and having its sides intermediate the ends thereof folded inwardly toward the center of the tube, the structure and arrangement of the tube being such that during expansion to actuate the brake there is no friction between the walls of the tube and the above described parts of the brake.

FREDERICK C. FRANK.